US010232840B2

United States Patent
Johri et al.

(10) Patent No.: US 10,232,840 B2
(45) Date of Patent: Mar. 19, 2019

(54) DECELERATION CONTROL FOR A HYBRID VEHICLE DURING TOWING

(71) Applicant: Ford Global Technologies, LLC, Dearborn, MI (US)

(72) Inventors: Rajit Johri, Canton, MI (US); Jeffrey Allen Doering, Canton, MI (US); Chen Zhang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 222 days.

(21) Appl. No.: 15/230,694

(22) Filed: Aug. 8, 2016

(65) Prior Publication Data
US 2018/0037219 A1   Feb. 8, 2018

(51) Int. Cl.
| | |
|---|---|
| *B60W 20/15* | (2016.01) |
| *F16H 61/21* | (2006.01) |
| *B60W 30/18* | (2012.01) |
| *B60W 20/30* | (2016.01) |
| *B60W 10/02* | (2006.01) |
| *B60W 10/11* | (2012.01) |

(Continued)

(52) U.S. Cl.
CPC ............ *B60W 20/15* (2016.01); *B60W 10/02* (2013.01); *B60W 10/026* (2013.01); *B60W 10/06* (2013.01); *B60W 10/08* (2013.01); *B60W 10/11* (2013.01); *B60W 20/30* (2013.01); *B60W 30/18072* (2013.01); *B60W 30/19* (2013.01); *F16H 61/21* (2013.01); *B60W 30/18136* (2013.01); *B60W 2030/18081* (2013.01); *B60W 2050/0088* (2013.01); *B60W 2540/103* (2013.01); *B60W 2540/106* (2013.01); *B60W 2540/12* (2013.01); *B60W 2710/105* (2013.01); *B60W 2720/10* (2013.01); *B60Y 2300/188* (2013.01); *B60Y 2300/28* (2013.01); *Y10S 903/945* (2013.01)

(58) Field of Classification Search
CPC .......... B60W 20/15; B60W 30/18072; B60W 30/18136; B60W 10/026; B60W 20/30; F16H 61/21; F16H 2061/0237
See application file for complete search history.

(56) References Cited

U.S. PATENT DOCUMENTS

| | | | | |
|---|---|---|---|---|
| 4,199,037 A | * | 4/1980 | White | B60K 3/04 180/65.245 |
| 6,126,251 A | * | 10/2000 | Yoshii | B60L 7/26 303/152 |

(Continued)

FOREIGN PATENT DOCUMENTS

| | | | | |
|---|---|---|---|---|
| EP | 1316464 A2 | * | 6/2003 | ............ B60K 6/485 |
| JP | 2008131700 A | * | 6/2008 | |

(Continued)

*Primary Examiner* — Behrang Badii
*Assistant Examiner* — David A Testardi
(74) *Attorney, Agent, or Firm* — David B. Kelley; Brooks Kushman P.C.

(57) ABSTRACT

A hybrid vehicle having an engine, an electric machine, and a step-ratio transmission includes a controller programmed to, in response to an accelerator lift-pedal event when operating in a towing mode, learn a vehicle speed, and apply a lift-pedal torque when vehicle speed exceeds the learned vehicle speed, and apply an adjusted lift-pedal torque based on a gear ratio after downshifting the transmission to maintain a constant output shaft torque otherwise.

18 Claims, 4 Drawing Sheets

(51) Int. Cl.
  *B60W 30/19* (2012.01)
  *B60W 10/06* (2006.01)
  *B60W 10/08* (2006.01)
  *B60W 50/00* (2006.01)

(56) References Cited

U.S. PATENT DOCUMENTS

| | | | |
|---|---|---|---|
| 7,014,592 B2 | 3/2006 | Wiethe et al. | |
| 7,672,770 B2 | 3/2010 | Inoue et al. | |
| 7,736,267 B2* | 6/2010 | Kaya | B60K 6/365 477/111 |
| 8,744,657 B2 | 6/2014 | Kaifuku et al. | |
| 9,026,296 B1* | 5/2015 | Johri | B60W 20/10 701/22 |
| 9,738,268 B1* | 8/2017 | Zhang | B60W 20/13 |
| 2001/0016795 A1* | 8/2001 | Bellinger | B60W 10/06 701/53 |
| 2004/0014565 A1* | 1/2004 | Oshima | B60W 10/06 477/182 |
| 2005/0101437 A1* | 5/2005 | Wiethe | F16H 61/21 477/120 |
| 2005/0278106 A1* | 12/2005 | Simon, Jr. | B60W 10/06 701/70 |
| 2006/0287798 A1* | 12/2006 | Inoue | B60L 11/14 701/70 |
| 2007/0173372 A1* | 7/2007 | Ueno | B60K 6/48 477/3 |
| 2007/0192010 A1* | 8/2007 | Carlstrom | B60T 1/10 701/70 |
| 2007/0205735 A1* | 9/2007 | Kiuchi | B60K 6/365 318/432 |
| 2008/0108477 A1* | 5/2008 | Noll | B60K 31/04 477/23 |
| 2009/0145673 A1* | 6/2009 | Soliman | B60K 6/365 180/65.1 |
| 2009/0150035 A1* | 6/2009 | Soliman | B60K 6/365 701/54 |
| 2010/0004808 A1* | 1/2010 | Tang | B60L 7/18 701/22 |
| 2010/0141201 A1* | 6/2010 | Littrell | H02J 7/35 320/101 |
| 2012/0265382 A1* | 10/2012 | Nefcy | B60W 10/06 701/22 |
| 2013/0066493 A1* | 3/2013 | Martin | B60W 20/00 701/22 |
| 2013/0210575 A1* | 8/2013 | Kumazaki | B60K 6/48 477/20 |
| 2014/0080668 A1* | 3/2014 | Doering | B60W 10/06 477/97 |
| 2014/0148983 A1* | 5/2014 | Kim | B60W 20/1062 701/22 |
| 2015/0151760 A1* | 6/2015 | Kim | F16D 48/06 701/67 |
| 2015/0251657 A1 | 9/2015 | Johri et al. | |
| 2016/0167638 A1* | 6/2016 | Liggins | B60K 6/20 477/5 |

FOREIGN PATENT DOCUMENTS

| | | | |
|---|---|---|---|
| JP | 2012116272 A | * | 6/2012 |
| JP | 2014111418 A | * | 6/2014 |
| JP | 2015-143075 A | * | 8/2015 |
| WO | WO-00/74964 A1 | * | 12/2000 |

* cited by examiner

DECELERATION CONTROL FOR A HYBRID VEHICLE DURING TOWING

TECHNICAL FIELD

The present disclosure relates to hybrid vehicles and methods of controlling deceleration in hybrid vehicles during towing.

BACKGROUND

Various types of vehicles may include a towing or tow haul mode that allows the vehicle to maintain speed while going downhill by using engine friction or engine braking to reduce the need for the driver to use the service brakes. This mode may be engaged by the driver when the vehicle is towing cargo in hilly terrain. The tow haul mode may attempt to maintain vehicle speed by progressively shifting to a lower gear (higher gear ratio) as the vehicle accelerates downhill. This mode usually does not request increased acceleration from vehicle controls if the vehicle is slowing.

For vehicles having a transmission with a torque converter, the torque converter bypass clutch is usually locked when downshifting to a lower gear to produce more negative torque at the wheels if the vehicle is accelerating downhill. Downshifting results in increased engine speed thereby producing higher friction torque as well as a higher ratio multiplication of engine torque to the vehicle wheels thereby providing more negative torque at the wheels. When the vehicle is slowing to a stop, the torque converter bypass clutch is unlocked during downshifts. Opening of the torque converter bypass clutch effectively separates the engine speed from vehicle speed and the engine transitions to speed control while the vehicle slows down smoothly without driver input.

In hybrid vehicles having a transmission with a torque converter and operating in a towing mode, the torque converter bypass clutch may be locked during downshifts even when the vehicle is slowing down to a stop to facilitate regenerative braking to increase energy efficiency. However, the resulting deceleration when the transmission downshifts as the vehicle slows down to a stop may be considered objectionable drivability for some drivers or occupants.

SUMMARY

In one embodiment, a hybrid vehicle having an engine, an electric machine, and a step-ratio transmission includes a controller programmed to, in response to an accelerator lift-pedal event when operating in a towing mode, learn a vehicle speed, and apply a lift-pedal torque when vehicle speed exceeds the learned vehicle speed, and apply an adjusted lift-pedal torque based on a gear ratio after downshifting the transmission to maintain a constant output shaft torque otherwise.

Various embodiments include a vehicle control system having a controller programmed to, in response to vehicle speed exceeding a learned speed stored in response to an accelerator lift-pedal while operating in a towing mode, produce a deceleration torque from an engine operating in fuel shut-off mode and an electric machine operating as a generator to maintain wheel torque constant before and after a step-ratio transmission downshift using associated transmission gear ratios. The controller may be further programmed to store a current vehicle speed as the learned speed in response to the current vehicle speed being less than a previously learned speed while the accelerator lift-pedal condition continues.

Embodiments may also include a method for controlling a vehicle having an engine, a step-ratio transmission, and an electric machine that includes storing, by a controller operating in a towing mode, a learned speed in response to accelerator and brake pedals being released, applying a first deceleration torque in response to vehicle speed being less than the learned speed and applying a second deceleration torque to maintain output torque before and after downshifting the transmission otherwise. The method may include storing a new learned speed in response to the vehicle speed being less than a previously stored learned speed while the accelerator and brake pedals are released. In one embodiment, applying the second deceleration torque includes modifying the first deceleration torque by a factor based on gear ratios of the step-ratio transmission before and after downshifting.

Embodiments according to the disclosure may provide one or more advantages. For example, systems or methods for a hybrid vehicle having a step-ratio transmission according to various embodiments provide a towing mode that learns a target speed to maintain a downhill speed while also providing constant output shaft torque when downshifting as the vehicle slows to a stop.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
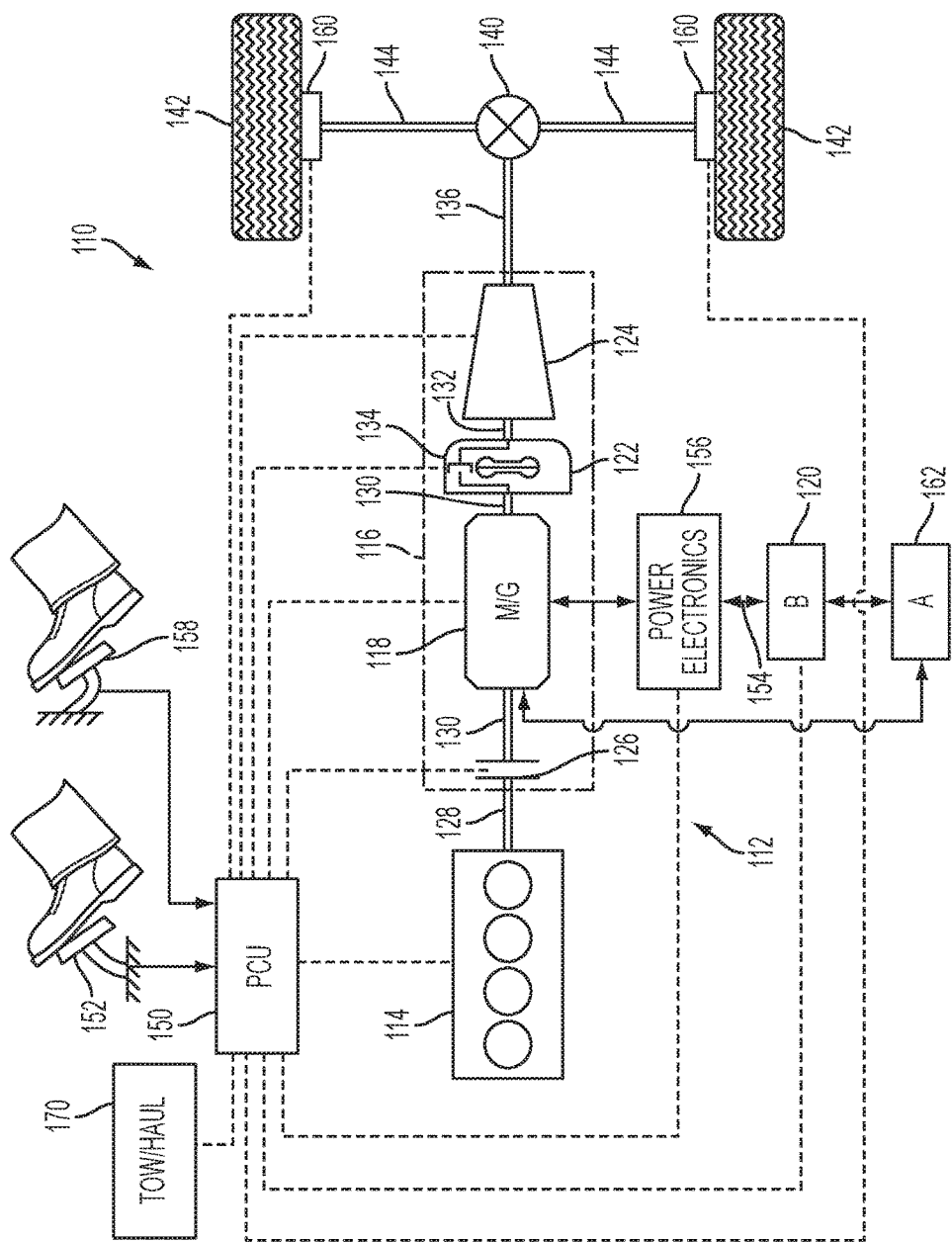
FIG. 1 is a schematic illustration of a representative powertrain of a hybrid electric vehicle.

Referring to FIG. 1, a schematic diagram of a hybrid electric vehicle (HEV) 110 is illustrated according to an embodiment of the present disclosure. FIG. 1 illustrates representative relationships among the components. Physical placement and orientation of the components within the vehicle may vary. The HEV 110 includes a powertrain 112. The powertrain 112 includes an engine 114 that drives a transmission 116, which may be referred to as a modular hybrid transmission (MHT). As will be described in further detail below, transmission 116 includes an electric machine such as an electric motor/generator (M/G) 118, an associated traction battery 120, a torque converter 122, and a multiple step-ratio automatic transmission, or gearbox 124.

The engine 114 and the M/G 118 are both drive sources for the HEV 110. The engine 114 generally represents a power source that may include an internal combustion engine such as a gasoline, diesel, or natural gas powered engine, or a fuel cell. The engine 114 generates an engine power and corresponding engine torque that is supplied to the M/G 18 when a disconnect clutch 126 between the engine 114 and the M/G 118 is at least partially engaged. The M/G 118 may be implemented by any one of a plurality of types of electric machines. For example, M/G 118 may be a permanent magnet synchronous motor. Power electronics 156 condition direct current (DC) power provided by the battery 120 to the requirements of the M/G 118, as will be described below. For example, power electronics may provide three phase alternating current (AC) to the M/G 118.

When the disconnect clutch 126 is at least partially engaged, power flow from the engine 114 to the M/G 118 or from the M/G 118 to the engine 114 is possible. For example, the disconnect clutch 126 may be engaged and M/G 118 may operate as a generator to convert rotational energy provided by a crankshaft 128 and M/G shaft 130 into electrical energy to be stored in the battery 120. The disconnect clutch 126 can also be disengaged to isolate the engine 114 from the remainder of the powertrain 112 such that the M/G 118 can act as the sole drive source for the HEV 110. Shaft 130 extends through the M/G 118. The M/G 118 is continuously drivably connected to the shaft 130, whereas the engine 114 is drivably connected to the shaft 130 only when the disconnect clutch 126 is at least partially engaged.

The M/G 118 is connected to the torque converter 122 via shaft 130. The torque converter 122 is therefore connected to the engine 114 when the disconnect clutch 126 is at least partially engaged. The torque converter 122 includes an impeller fixed to M/G shaft 130 and a turbine fixed to a transmission input shaft 132. The torque converter 122 thus provides a hydraulic coupling between shaft 130 and transmission input shaft 132. The torque converter 122 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch (also known as a torque converter lock-up clutch) 134 may also be provided that, when engaged, frictionally or mechanically couples the impeller and the turbine of the torque converter 122, permitting more efficient power transfer. The torque converter bypass clutch 134 may be operated as a launch clutch to provide smooth vehicle launch. Alternatively, or in combination, a launch clutch similar to disconnect clutch 126 may be provided between the M/G 118 and gearbox 124 for applications that do not include a torque converter 122 or a torque converter bypass clutch 134. In some applications, disconnect clutch 126 is generally referred to as an upstream clutch and launch clutch 134 (which may be a torque converter bypass clutch) is generally referred to as a downstream clutch.

The gearbox 124 may include gear sets (not shown) that are selectively placed in different gear ratios by selective engagement of friction elements such as clutches and brakes (not shown) to establish the desired multiple discrete or step drive ratios. The friction elements are controllable through a shift schedule to control the ratio between a transmission output shaft 136 and the transmission input shaft 132. The gearbox 124 is automatically shifted from one ratio to another based on various vehicle and ambient operating conditions by an associated controller, such as a powertrain control unit (PCU). Power and torque from both the engine 114 and the M/G 118 may be delivered to gearbox 124. The gearbox 124 then provides powertrain output power and torque to output shaft 136.

It should be understood that the hydraulically controlled gearbox 124 used with a torque converter 122 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 124 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 136 is connected to a differential 140. The differential 140 drives a pair of wheels 142 via respective axles 144 connected to the differential 140. The differential transmits approximately equal torque to each wheel 142 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 112 further includes an associated controller 150 such as a powertrain control unit (PCU). While illustrated as one controller, the controller 150 may be part of a larger control system and may be controlled by various other controllers throughout the vehicle 110, such as a vehicle system controller (VSC). It should therefore be understood that the powertrain control unit 150 and one or more other controllers can collectively be referred to as a "controller" that controls various actuators in response to signals from various sensors to control functions such as starting/stopping engine 114, operating M/G 118 to provide wheel torque or charge battery 120, select or schedule transmission shifts, etc. Controller 150 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 150 may communicate signals to and/or from engine 114, disconnect clutch 126, M/G 118, battery 120, launch clutch 134, transmission gearbox 124, and power electronics 156. Although not explicitly illustrated, those of ordinary skill in the art will recognize various functions or components that may be controlled by controller 150 within each of the subsystems identified above. Representative examples of parameters, systems, and/or components that may be directly or indirectly actuated using control logic and/or algorithms executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging or discharging (including determining the maximum charge and discharge power limits), regenerative braking, M/G operation, clutch pressures for disconnect clutch 126, launch clutch 134, and transmission gearbox 124, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 134 status (TCC), deceleration or shift mode (MDE), battery temperature, voltage, current, or state of charge (SOC) for example.

Control logic, functions, or algorithms performed by controller 150 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 150. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 152 is used by the driver of the vehicle to provide a demanded torque, power, or drive command to propel the vehicle. In general, depressing and releasing the accelerator pedal 152 generates an accelerator pedal position signal that may be interpreted by the controller 150 as a demand for increased power or decreased power, respectively. Release of accelerator pedal 152 may be interpreted differently depending on the particular operating mode. In one embodiment, the vehicle may include a tow/haul mode that may be activated by a corresponding switch or other interface represented at 170. Accelerator pedal tip-out while operating in tow/haul mode may be interpreted as a request to maintain vehicle speed and apply a negative torque to the vehicle wheels until the vehicle speed is below a low-speed threshold where positive creep torque is applied. The negative torque may be applied by the engine 114 and/or M/G 118 as a drag torque or regenerative braking torque depending on the current operating status of clutches 126 and 134. Gearbox 124 may also be controlled to automatically downshift to a higher gear ratio (lower gear) to manage or maintain downhill speed without applying the service brakes as described in greater detail herein.

As also shown in FIG. 1, a brake pedal 158 may be used by the driver of the vehicle to provide a demanded braking torque to slow the vehicle. In general, depressing and releasing the brake pedal 158 generates a brake pedal position signal that may be interpreted by the controller 150 as a demand to decrease the vehicle speed. Based upon inputs from the accelerator pedal 152 and brake pedal 158, the controller 150 commands the torque to the engine 114, M/G 118, and friction brakes 160. The controller 150 also controls the timing of gear shifts within the gearbox 124, as well as engagement or disengagement of the disconnect clutch 126 and the torque converter bypass clutch 134. Like the disconnect clutch 126, the torque converter bypass clutch 134 can be modulated across a range between the engaged and disengaged positions. This produces a variable slip in the torque converter 122 in addition to the variable slip produced by the hydrodynamic coupling between the impeller and the turbine. Alternatively, the torque converter bypass clutch 134 may be operated as locked or open without using a modulated operating mode depending on the particular application.

To drive the vehicle with the engine 114, the disconnect clutch 126 is at least partially engaged to transfer at least a portion of the engine torque through the disconnect clutch 126 to the M/G 118, and then from the M/G 118 through the torque converter 122 and gearbox 124. The M/G 118 may assist the engine 114 by providing additional power to turn the shaft 130. This operation mode may be referred to as a "hybrid mode" or an "electric assist mode."

To drive the vehicle with the M/G 118 as the sole power source, the power flow remains the same except the disconnect clutch 126 isolates the engine 114 from the remainder of the powertrain 112. Combustion in the engine 114 may be disabled or otherwise OFF during this time to conserve fuel. The traction battery 20 transmits stored electrical energy through wiring 154 to power electronics 156 that may include an inverter, for example. The power electronics 56 convert DC voltage from the battery 120 into AC voltage to be used by the M/G 118. The controller 150 commands the power electronics 156 to convert voltage from the battery 120 to an AC voltage provided to the M/G 118 to provide positive or negative torque to the shaft 130. This operation mode may be referred to as an "electric only" or "EV" operation mode.

In any mode of operation, the M/G 118 may act as a motor and provide a driving force for the powertrain 112. Alternatively, the M/G 118 may act as a generator and convert kinetic energy from the powertrain 12 into electric energy to be stored in the battery 120. The M/G 118 may act as a generator while the engine 114 is providing propulsion power for the vehicle 110, for example. The M/G 118 may additionally act as a generator during times of regenerative braking in which torque and rotational (or motive) energy or power from spinning wheels 142 is transferred back through the gearbox 124, torque converter 122, (and/or torque converter bypass clutch 134) and is converted into electrical energy for storage in the battery 120.

The battery 120 and the M/G 118 may also be configured to provide electrical power to one or more vehicle accessories 162. The vehicle accessories 162 may include, but are not limited to, air conditioning systems, power steering systems, electric heaters, or any other system or device that is electrically operated.

It should be understood that the schematic illustrated in FIG. 1 is merely representative and is not intended to be limiting. Other configurations are contemplated that utilize selective engagement of both an engine and a motor to transmit torque through the transmission. For example, the M/G 118 may be offset from the crankshaft 128, an additional motor may be provided to start the engine 114, and/or the M/G 118 may be provided between the torque converter 122 and the gearbox 124. Other configurations are contemplated without deviating from the scope of the present disclosure.

As previously described, vehicle 110 may include a tow/haul mode that may be activated by the driver using a button, switch, or other input 170 when hauling heavy loads or towing a trailer, particularly in hilly terrain. The tow/haul mode may use various types of engine braking by operating engine 114 without fueling the cylinders in a deceleration fuel shut-off (DFSO) mode, and may include altering valve timing to increase compression work in engines equipped with variable cam timing or variable valve timing devices. The tow/haul mode may also use M/G 118 in a regenerative braking mode or otherwise operating as a generator to provide negative torque or drag torque. In one embodiment, operation of vehicle 110 in tow/haul mode modifies the base tip-out or lift-foot strategy by modifying the negative torque produced by engine 114 and/or M/G 118 to assist in maintaining a learned target vehicle speed when traveling downhill while also providing smooth torque transitions when the vehicle is slowing to a stop.

Figure 2:
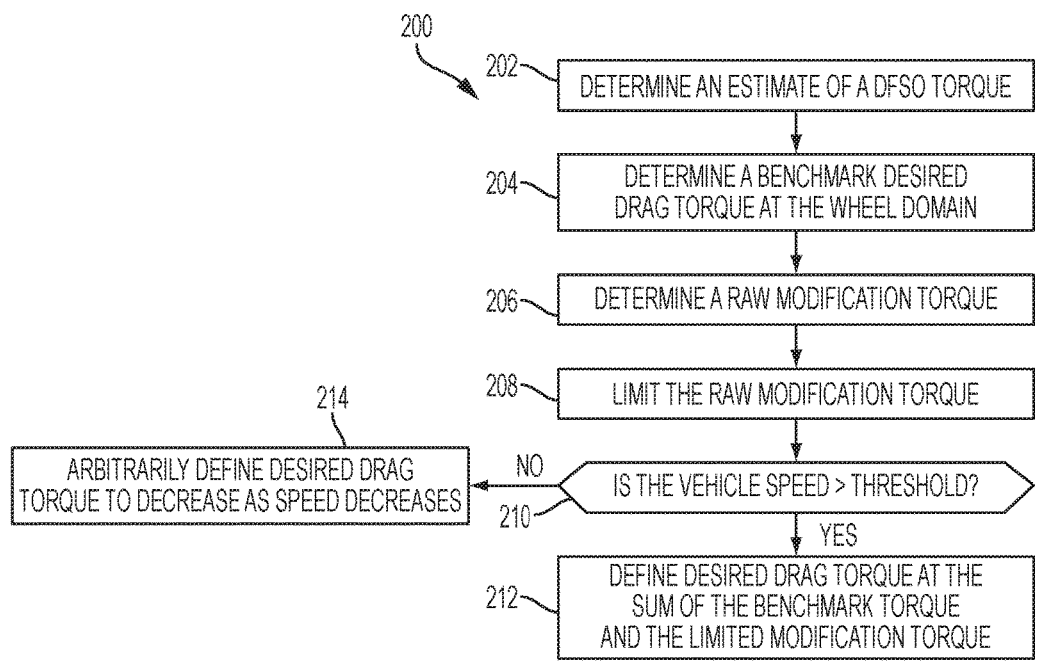
FIG. 2 is flowchart illustrating a representative base strategy for deceleration control of a hybrid vehicle when operating in a normal mode.

A representative base strategy for controlling deceleration in a hybrid vehicle is illustrated in the flowchart of FIG. 2. The desired vehicle deceleration relative to vehicle speed for a currently selected transmission gear ratio may be determined during vehicle development to provide desired drivability similar to a conventional, non-hybrid vehicle. The strategy illustrated in FIG. 2 provides similar deceleration drivability in a hybrid vehicle having deceleration torque provided by either or both of engine 114 and M/G 118. To achieve a desired deceleration torque, the transmission gearbox 124 may also be controlled to automatically downshift to provide a lower gear (higher gear ratio).

In the representative base deceleration control strategy or system 200, torque converter bypass clutch 134 is maintained in a locked position as long as possible to utilize the M/G 118 to convert the kinetic energy of the HEV 110 into electrical power to either charge the battery 120 or to power one or more vehicle accessories 162. The torque converter bypass clutch 134 may remain in the locked condition until the HEV 110 comes to a complete stop (i.e., has a vehicle speed of zero) during the deceleration event. The control system 200 utilizes the DFSO torque of the engine 114 and/or the torque created by the M/G 118 acting as a generator to decelerate the HEV 110 during the deceleration event. The control system 200 may be implemented via algorithms and/or control logic stored within the memory of the controller 150.

The control system 200 estimates DFSO torque at block 202. The DFSO torque estimate at the highest gear ratio of the transmission gearbox 124 may be used as a benchmark torque value for a desired drag torque during a deceleration event. Alternatively, any calibrated or specified gear ratio may be used, e.g. gear 6 in a 10-speed gearbox. More specifically, the DFSO torque estimate may be a torque estimate based on a virtual impeller speed (which may correspond to the speed of the WG shaft 130). The virtual impeller speed may be based on current vehicle speed with the transmission gearbox 124 in the highest gear ratio. It should be understood that the estimated DFSO torque is being used as a benchmark and that an actual deceleration torque may be applied by the engine 114 or the M/G 118 alone or in combination. The desired drag torque may also be referred to as the desired accelerator lift pedal torque (which is the desired drag torque resulting from an operator releasing the accelerator pedal 152) and the desired deceleration event may be referred to as an accelerator lift pedal event (which is an event corresponding to the operator releasing the accelerator pedal). At block 204 the benchmark torque value for the desired drag torque based on the DFSO torque estimate is converted to a desired torque value at the wheels 142 based on the following equation:

$$T_{bench}=T_{engine\_frc\_est}(\omega_{imp}^{virt})*N_{trans}^{virt}*N_{final} \qquad (1)$$

where, $T_{bench}$ is the benchmark for the desired drag torque, $T_{engine\_frc\_est}(\omega_{imp}^{virt})$ is the estimated friction torque of the engine 114 which is a function of the virtual rotational speed of the impeller $\omega_{imp}$ (which is an estimated impeller speed based on current vehicle speed with the transmission gearbox 124 in the highest gear ratio), $N_{trans}^{virt}$ is the virtual gear ratio of the transmission gearbox 124 while in the highest gear ratio (the highest input to output gear ratio of the transmission gearbox, or a designated or specified gear ratio), and $N_{final}$ is the final drive ratio between the output of the transmission gearbox 124 and the wheels 142 that accounts for any additional gear ratios that may be located between the transmission gearbox 124 and the wheels 142 (e.g., the gear ratio of the differential 140).

The control system 200 then determines a raw modification torque that accounts for a desired electrical power output of the M/G 118. The desired electrical power output of the M/G 118 may include a desired charging power to recharge the battery 120 and/or a desired operating power to operate at least one of the vehicle accessories 162. The raw modification torque is determined at block 206 based on the following equation:

$$T_{mot\_adj\_raw} = \frac{P_{acc\_dmd}(t)}{\omega_{whl}} + \frac{P_{bat\_chrg}(\omega)}{\omega_{whl}} \quad (2)$$

where $T_{mot\_adj\_raw}$ is raw modification torque, $P_{acc\_dmd}(t)$ is a time dependent load to operate at least one of the vehicle accessories (e.g., turning on/off an air conditioning load), $P_{bat\_chrg}(\omega)$ is a calibratable additional desired battery charge power, which determines how fast the battery 120 will charge when the engine 114 is in a DFSO torque mode, and $\omega_{whl}$ is the rotational speed of the wheels 142.

Once the raw modification torque is determined, the raw modification torque is limited to a value that does not exceed a portion or percentage above the DFSO (or benchmark) torque $T_{bench}$ at block 208. The limited modification torque represents a portion of the desired drag torque that is applied with the M/G 18 during a deceleration event and may be represented by the following term:

$$T_{mot\_adj} = \min\left(\frac{P_{acc\_dmd}(t)}{\omega_{whl}} + \frac{P_{bat\_chrg}(\omega)}{\omega_{whl}}, a\% * T_{bench}\right) \quad (3)$$

where $T_{mot\_adj}$ is limited modification torque and a % is a limiting factor. The limiting factor a % may be a calibratable single value, a percentage above the DFSO torque, or a curve that is a function of the rotational speed of the wheels $\omega_{whl}$. The term $a\% * T_{bench}$ sets an upper bound for the $$\frac{P_{acc\_dmd}(t)}{\omega_{whl}} + \frac{P_{bat\_chrg}(\omega)}{\omega_{whl}}$$

term such that variation of the limited modification torque $T_{mot\_adj}$ is bound when either or both the $$\frac{P_{acc\_dmd}(t)}{\omega_{whl}}$$

term and the $$\frac{P_{bat\_chrg}(\omega)}{\omega_{whl}}$$

term vary between zero and a highest value. The term $$\frac{P_{acc\_dmd}(t)}{\omega_{whl}}$$

may become zero when the operator, for example, switches off the accessories (e.g., air-conditioning system) 162. The term $$\frac{P_{bat\_chrg}(\omega)}{\omega_{whl}}$$

may become zero when the battery 120 is fully charged. Those of ordinary skill in the art will recognize that equation (3) applies to the magnitude or absolute value of the terms. In practice, all of the terms will typically have negative signs and a maximum function would be used in place of the minimum function.

As also illustrated in FIG. 2, block 210 determines whether vehicle speed is greater or less than a threshold speed. Alternatively it may be determined if the rotational speed of the wheels $\omega_{whl}$ is greater or less than a threshold at block 210. If the vehicle speed is greater than the threshold, block 212 determines the desired drag torque based on the sum of DFSO (or benchmark) torque $T_{bench}$ and the limited modification torque $T_{mot\_adj}$ and may be represented by the following equation:

$$T_{lfdmd}(\omega)|_{(\omega > threshold\ speed)} = T_{bench} + T_{mot\_adj} \quad (4)$$

where $T_{lfdmd}(\omega)|_{(\omega > threshold\ speed)}$ is the desired drag torque at the wheels 42.

If the vehicle speed is less than the threshold, block 214 sets the desired drag torque to monotonically decrease as vehicle speed (or rotational speed of the wheels $\omega_{whl}$) decreases. The desired drag torque may monotonically decrease at a first rate at block 214. Once the vehicle speed (or rotational speed of the wheels $\omega_{whl}$) falls below a second threshold, the desired drag torque may monotonically decrease at a second rate greater than the first rate until the vehicle speed falls below another threshold where the drag torque is set to zero.

The limiting factor a % defined in block 208 prevents the modification torque from deviating from the DFSO torque beyond a desired amount. Allowing the modification torque to deviate from the DFSO torque beyond a desired amount may cause the HEV 110 to decelerate at a higher than expected or desired rate which may cause produce objectionable drivability for some operators.

Figure 3:
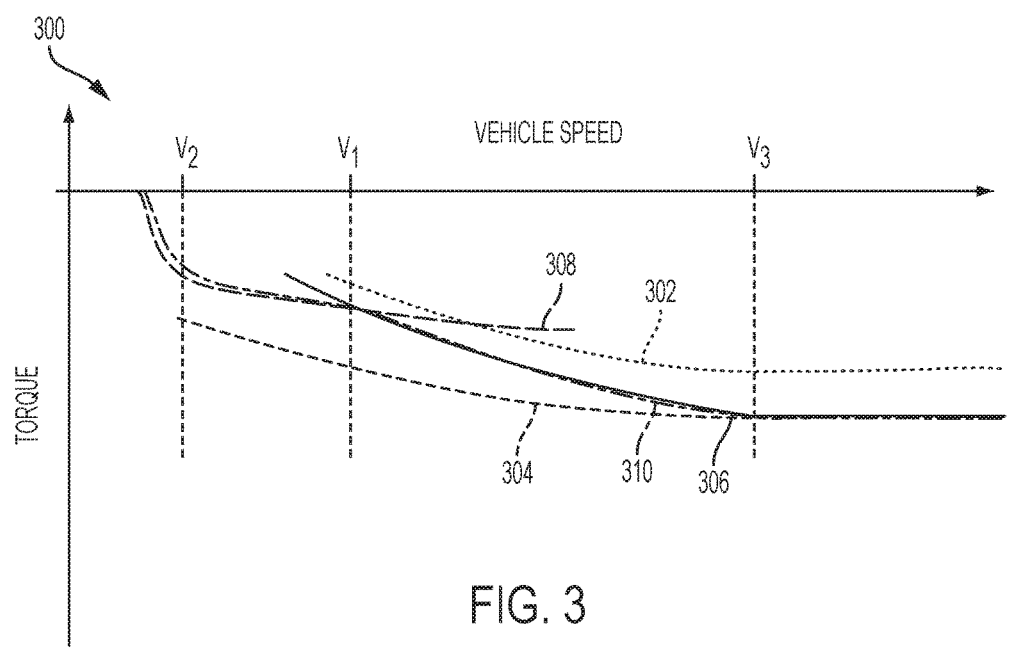
FIG. 3 is a representative graph illustrating a desired drag torque (or lift pedal torque) during normal operation mode.

Referring to FIG. 3 a representative graph 300 illustrating a desired base drag torque (or lift pedal torque) corresponding to vehicle speed during a deceleration event (or lift pedal event) is illustrated. As previously described, the base strategy for determining the drag torque or lift pedal torque is used when the vehicle is not operating in tow/haul mode. The deceleration event depicted in graph 300 is implemented according to the control system 200 via algorithms and/or control logic that are stored within the memory of the controller 150. Line 302 represents the DFSO torque (or benchmark torque) $T_{bench}$. Line 304 represents the sum of the benchmark torque $T_{bench}$ and the raw modification torque $T_{mot\_adj\_raw}$. Therefore, line 304 is the desired drag torque, which may be produced by the engine 114 and/or the M/G 118, that is capable of generating the electrical power with the M/G 118 during the deceleration event to meet the electric power demands of both the battery 120 and the accessories 162.

Line 306 represents the sum of the benchmark torque $T_{bench}$ and the limited modification torque $T_{mot\_adj}$, which is equal to the desired drag torque at the wheels $T_{lfdmd}(\omega)|_{(\omega > threshold\ speed)}$. Line 308 represents the arbitrarily defined desired drag torque that monotonically decreases as the speed decreases. Line 306 will dictate the value of a commanded (or requested) drag torque when the vehicle speed is greater than a first threshold speed, which is represented by $V_1$. Line 308 will dictate the value of the commanded desired drag torque when the vehicle speed is less than the first threshold speed $V_1$. Line 310 represents the commanded desired drag torque. Line 306 and line 308 will have an interaction point at the first threshold speed $V_1$ where the value of the desired drag torque switches from being dictated by line 306 to line 308. The desired drag torque at line 306 and the desired drag torque at line 308 will have equal values at the first threshold speed $V_1$ to prevent a sudden drop in torque during the deceleration event.

During a first period of time during the deceleration event, corresponding to a period of time prior to the vehicle speed falling below the first threshold speed $V_1$, the commanded desired drag torque 310 is limited to the sum of the benchmark torque $T_{bench}$ and the limited modification torque $T_{mot\_adj}$ (line 306) which is less than the sum of the benchmark torque $T_{bench}$ and the raw modification torque $T_{mot\_adj\_raw}$ (line 304). During this period of time the drag torque is limited such that the M/G 118 generator torque does not produce the desired electrical power output to meet the charging demand of the battery 120 and/or the electrical power request of the accessories 162.

During a second period of time during the deceleration event, corresponding to a period of time after the vehicle speed falls below the first threshold speed $V_1$ but while the vehicle speed remains above a second threshold speed $V_2$, the commanded desired drag torque 310 is dictated by the arbitrarily defined desired drag torque 308 and monotonically decreases at a first rate. Once the vehicle speed decreases below the second threshold speed $V_2$, the commanded desired drag torque 310 is still dictated by the arbitrarily defined desired drag torque 308. However, the commanded desired drag torque after the vehicle speed decreases below the second threshold speed $V_2$ monotonically decreases at a second rate (which may be greater in magnitude than the first rate) to zero during a third period of time.

The graph 300 also depicts a period during the deceleration event, corresponding to a vehicle speed of greater than $V_3$, where the sum of the benchmark torque $T_{bench}$ and the limited modification torque $T_{mot\_adj}$ 306 is greater than the sum of the benchmark torque $T_{bench}$ and the raw modification torque $T_{mot\_adj\_raw}$ 304. During this period of time the sum of the benchmark torque $T_{bench}$ and the raw modification torque $T_{mot\_adj\_raw}$ 304 will dictate the commanded desired drag torque.

With regard to the desired drag torque values described above, it should be understood that an increase or a decrease in any of the drag torque values or any rate at which the drag torque values may change should be interpreted as an unsigned or absolute value representing the magnitude of the change. Therefore, an increase in a negative drag torque value should be construed as a negative value that is farther away from zero and a decrease in a negative drag torque value should be construed as a negative value that is closer to zero.

Figure 4:
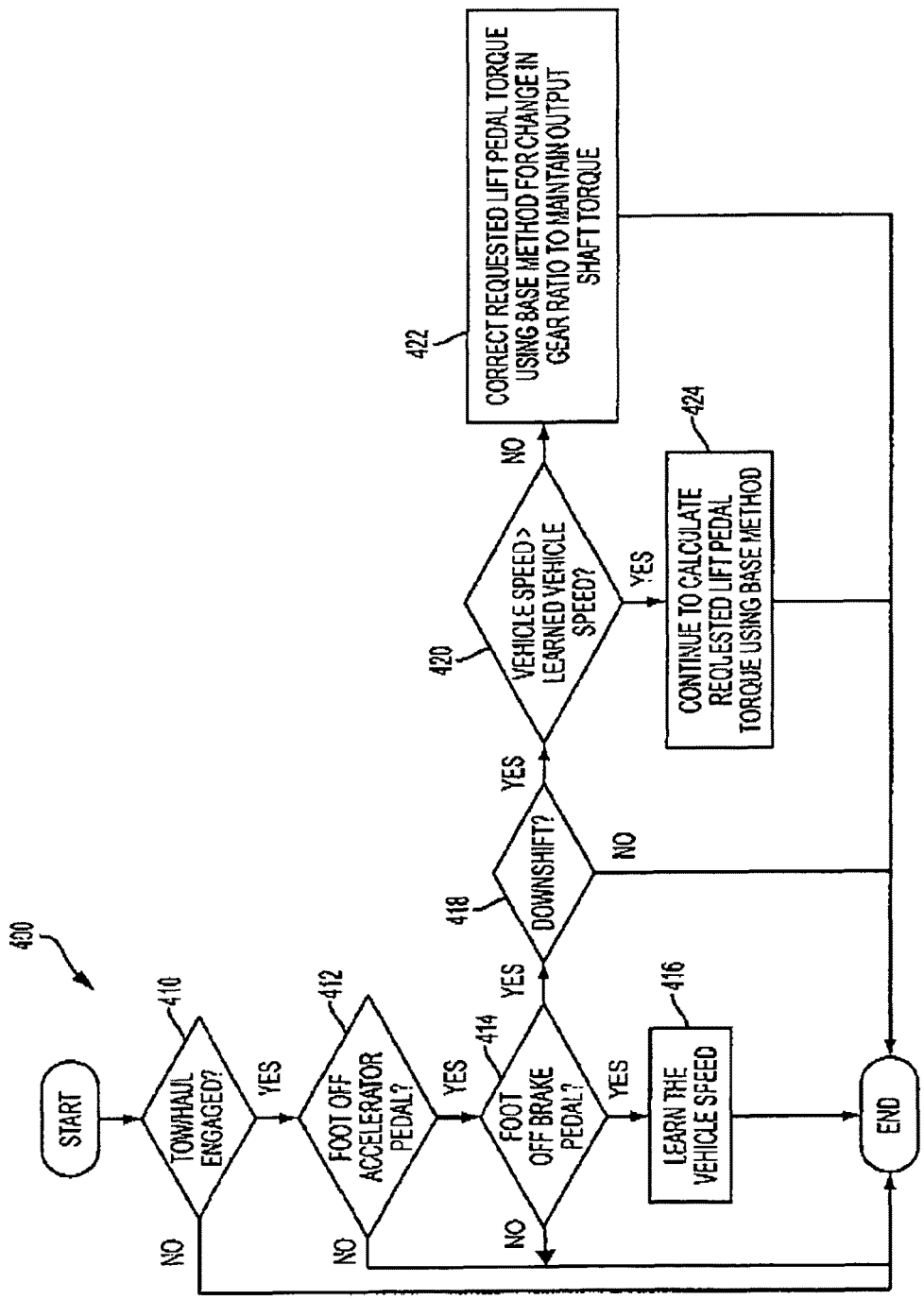
FIG. 4 is a flowchart illustrating a system or method for operating a hybrid vehicle in tow/haul mode that modifies a base deceleration or lift pedal torque to maintain a learned downhill speed or decelerate to a stop.

FIG. 4 is a flowchart illustrating a system or method for operating a hybrid vehicle in tow/haul mode that modifies a base deceleration or lift pedal torque to maintain a learned downhill speed or decelerate to a stop. Block 410 determines whether the tow/haul mode has been engaged. In response to operating in the tow/haul mode as determined at 410, block 412 detects a lift foot condition based on accelerator pedal position being less than a threshold value. In a similar fashion, block 414 detects whether the brake pedal is released based on brake pedal position being less than a threshold value. The controller 150 (FIG. 1) monitors the vehicle speed while operating in tow/haul mode and learns or stores the vehicle speed as a target vehicle speed at 416 in response to detecting lift foot conditions for both the accelerator pedal at 412 and brake pedal at 414. The learned target vehicle speed is updated or corrected if the vehicle continues to decelerate and vehicle speed decreases.

In response to detecting an automatic transmission downshift at 418, the tow/haul strategy compares the previously stored learned target vehicle speed from 416 with the current vehicle speed at 420. If the current vehicle speed exceeds the previously stored learned target vehicle speed at 420, the controller 150 (FIG. 1) interprets the transmission downshift detected at 418 as a desire to provide higher friction and/or regenerative braking torque and continues to use the base strategy lift pedal control at 424 to control the deceleration torque as described above with respect to FIGS. 2-3.

If the present vehicle speed is lower than the previously stored learned target vehicle speed at 420, then the controller interprets the transmission downshift as being in response to the vehicle slowing down to a stop. The controller then adjusts, modifies, or corrects the desired torque converter impeller torque from the base lift pedal strategy based on the change in gear ratio to maintain output shaft torque as represented at 422. In one embodiment a correction factor is used to account for a change in the gear ratio with a downshift as calculated by the controller according to a ratio of the highest gear ratio to the gear ratio after the downshift as described below.

The correction factor to account for change in gear ratio with downshift can be calculated by:

$$\beta = \frac{N_{trans}^{virt}}{N_{trans}^{new}}$$

where $N_{trans}^{virt}$ represents the gear ratio of the transmission gearbox while in the highest gear ratio (the highest input to output gear ratio of the transmission gearbox, also used in equation (1)) and $N_{trans}^{new}$ is the new gear ratio after a downshift. The new desired impeller torque can then be calculated as $$\tau_{dem}^{mod}(\omega)=\beta*\tau_{dem}^{base}(\omega)$$

where $\tau_{dem}^{base}(\omega)$ is the base lift pedal impeller torque demand and $\tau_{dem}^{mod}(\omega)$ is the new adjusted/modified/corrected desired impeller torque demand. The increase in engine friction due to the higher engine speed in the new gear may be corrected by either applying positive torque from the motor, or partially fueling the engine such that combined engine and motor torque compensates for the increase in engine friction torque as determined by the control system.

As such, the correction factor accounts for both the increase in wheel torque due to the increase in transmission gear ratio as well as the increase in engine friction (actual or estimated) due to the increase in the impeller speed. Therefore, the desired impeller torque in the latter case will be lower than the impeller torque provided by the base strategy calculation described in FIGS. 2-3. The adjustment provided as represented in block 422 allows the vehicle to smoothly slow down without creating drivability issues that may be objectionable to some occupants as the transmission downshifts with a locked torque converter to allow regenerative braking.

As previously described with respect to FIGS. 2-3, the base strategy for lift pedal torque requests impeller torque as a function of impeller speed. This logic relies on an estimate of engine friction torque at any given impeller speed. When operating in electric mode with engine 114 off, this requested torque is the torque the engine would have produced if it was on and not fueled, also referred to as the DFSO torque. When operating in hybrid mode, this requested torque is based on engine friction estimation and is met by the engine operating in the DFSO mode.

While representative embodiments are described above, it is not intended that these embodiments describe all possible forms of the claimed subject matter. Rather, the words used in the specification are words of description rather than limitation, and it is understood that various changes may be made without departing from the spirit and scope of the disclosure. Additionally, the features of various implementing embodiments may be combined to form further embodiments that are not explicitly described or illustrated. While various embodiments may have been described as providing advantages or being preferred over other embodiments or prior art implementations with respect to one or more desired characteristics, as one of ordinary skill in the art is aware, one or more features or characteristics may be compromised to achieve desired overall system attributes, which depend on the specific application and implementation. These attributes include, but are not limited to: cost, strength, durability, life cycle cost, marketability, appearance, packaging, size, serviceability, weight, manufacturability, ease of assembly, etc. Embodiments described as less desirable than other embodiments or prior art implementations with respect to one or more characteristics are not necessarily outside the scope of the disclosure and may be desirable for particular applications.

What is claimed is:

1. A vehicle comprising:
an engine;
an electric machine;
a step-ratio transmission having a torque converter bypass clutch; and
a controller programmed to,
responsive to an accelerator lift-pedal event when operating in a towing mode,
store a learned vehicle speed,
command a lift-pedal torque when current vehicle speed exceeds the learned vehicle speed, and
command an adjusted lift-pedal torque based on the transmission gear ratio after downshifting the transmission with the bypass clutch locked otherwise.

2. The vehicle of claim 1, the controller further programmed to learn the learned vehicle speed in response to detecting an accelerator pedal position less than an associated threshold and a brake pedal position less than an associated threshold.

3. The vehicle of claim 1 further comprising a switch in communication with the controller and operable to activate the towing mode.

4. The vehicle of claim 1 wherein the controller commands the lift-pedal torque by operating the engine in a deceleration fuel shut-off (DFSO) torque mode.

5. The vehicle of claim 1 wherein the controller is further programmed to calculate the adjusted lift-pedal torque by applying a correction factor to the lift-pedal torque based on an increase in wheel torque and an increase in friction of the engine associated with the transmission downshift.

6. The vehicle of claim 5 wherein the friction of the engine is estimated based on impeller speed of the torque converter.

7. The vehicle of claim 1 wherein the controller is further programmed to store the learned vehicle speed in response to the current vehicle speed being less than a previously stored learned vehicle speed.

8. A vehicle control system comprising:
a controller programmed to,
in response to current vehicle speed less than a learned vehicle speed stored in response to an accelerator lift-pedal event while operating in a towing mode, command a deceleration torque from an engine operating in fuel shut-off mode and an electric machine operating as a generator, to maintain vehicle wheel torque constant before and after a vehicle step-ratio transmission downshift with a transmission torque converter bypass clutch locked.

9. The system of claim 8 wherein the controller is further programmed to store the current vehicle speed as the learned vehicle speed in response to the current vehicle speed being less than a previously stored learned vehicle speed while the accelerator lift-pedal event continues.

10. The system of claim 8 wherein the controller is further programmed to apply an adjustment factor to the deceleration torque based on the transmission gear ratio after the transmission downshift.

11. The system of claim 8 wherein the transmission comprises a torque converter having a bypass clutch, the controller further programmed to maintain the bypass clutch locked during downshifting of the step-ratio transmission.

12. The system of claim 8 further comprising a switch in communication with the controller and operable to activate the towing mode.

13. The system of claim 8 wherein the controller is further programmed to store the learned speed in response to detecting a brake pedal position less than an associated threshold.

14. The system of claim 8 wherein the controller is further programmed to detect an accelerator lift-pedal event in response to accelerator pedal position being less than an associated threshold.

15. A method for controlling a vehicle having an engine, a step-ratio transmission including a torque converter with a bypass clutch, and an electric machine, comprising:
storing, by a controller operating in a towing mode, a learned speed in response to accelerator and brake pedals being released;
commanding a first deceleration torque in response to current speed being greater than the learned speed; and
commanding a second deceleration torque less than the first to maintain constant wheel torque before and after downshifting the transmission with the bypass clutch locked otherwise.

16. The method of claim 15 further comprising storing a new learned speed in response to the current speed being less than a previously stored learned speed while the accelerator and brake pedals are released.

17. The method of claim 15 wherein applying the second deceleration torque comprises modifying the first deceleration torque by a factor based on gear ratios of the step-ratio transmission before and after downshifting.

18. The method of claim 15 further comprising operating in the towing mode in response to detecting activation of a towing mode switch.

* * * * *